UNITED STATES PATENT OFFICE.

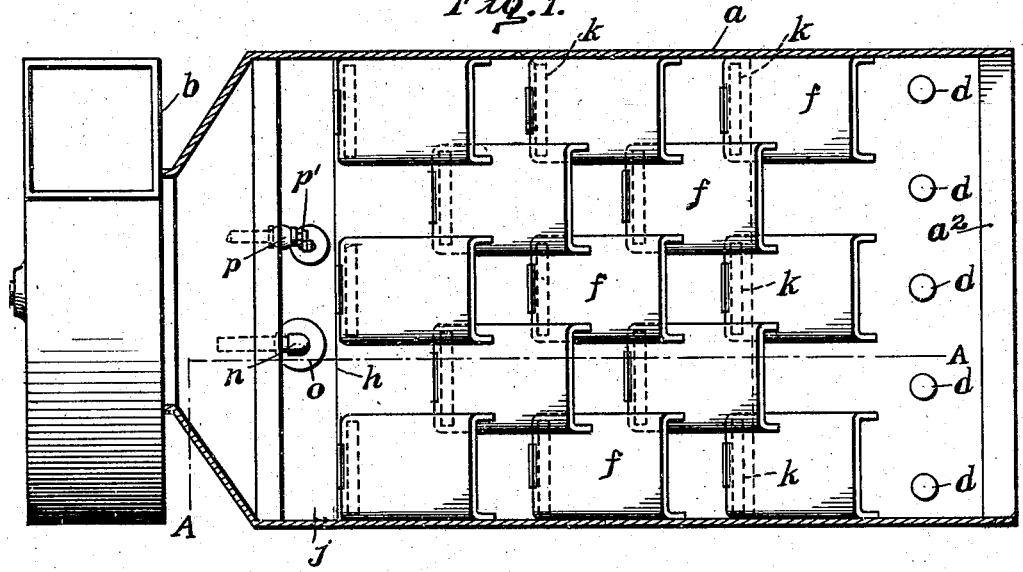
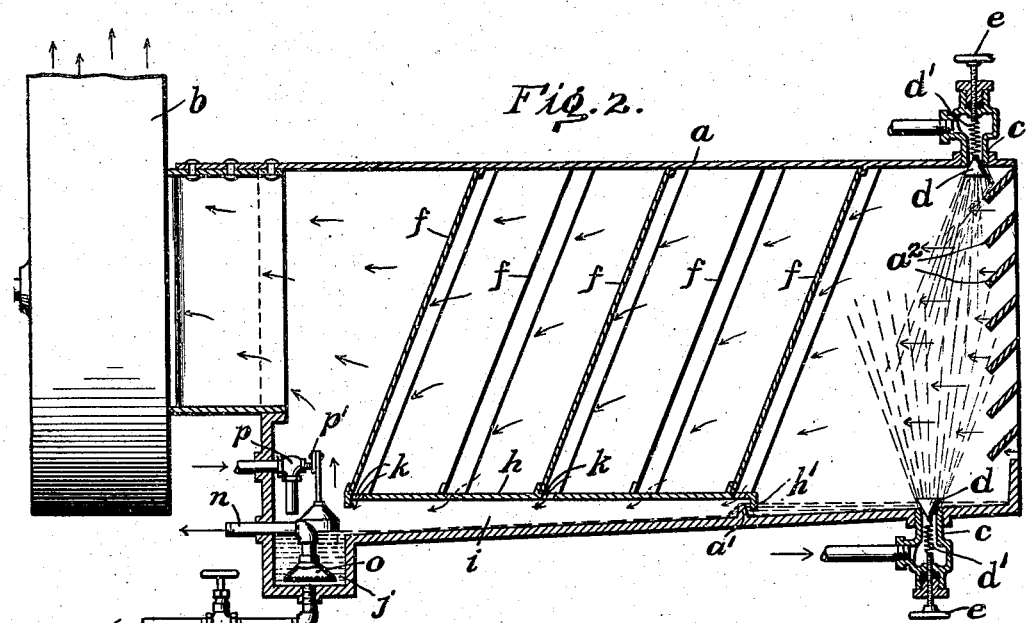

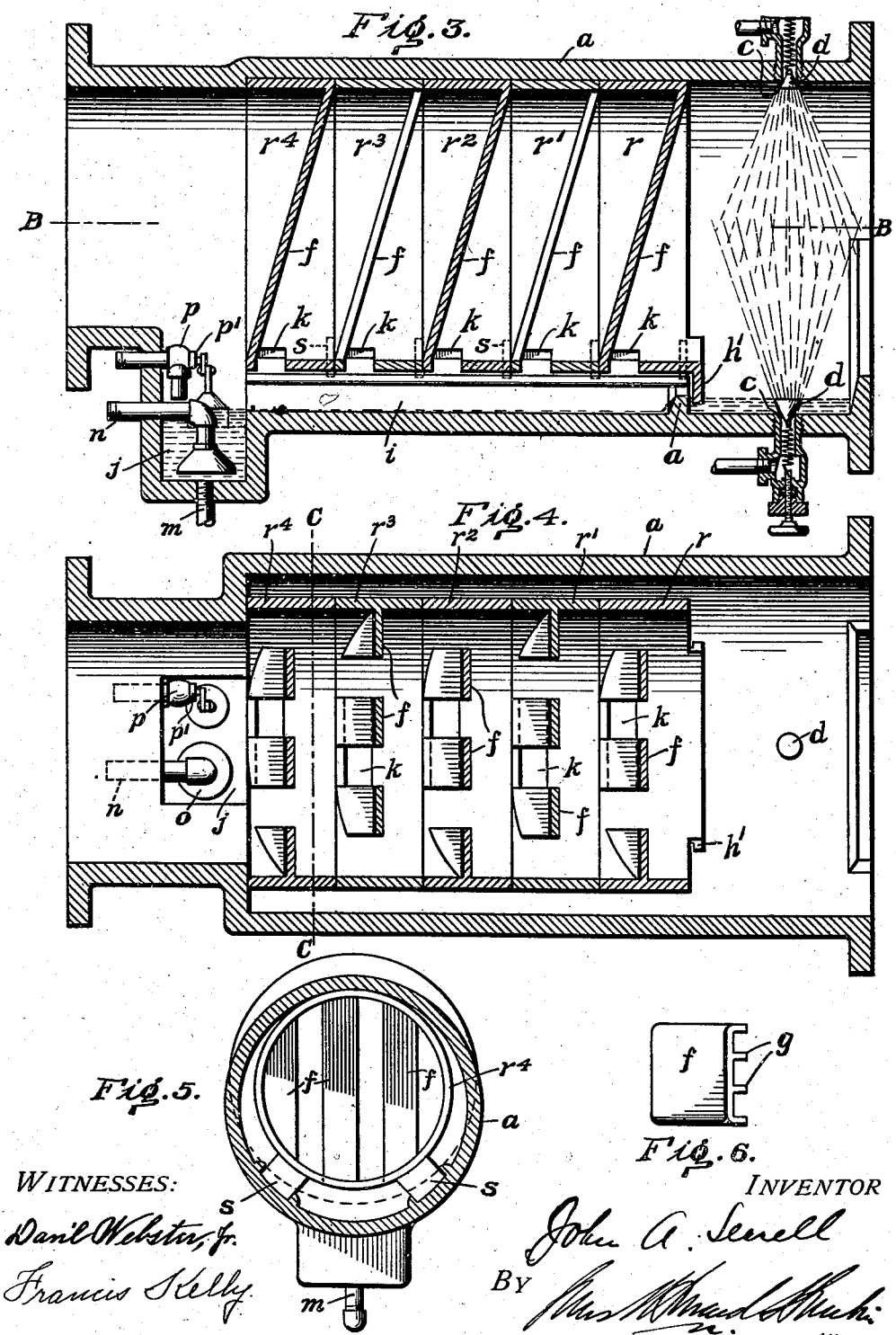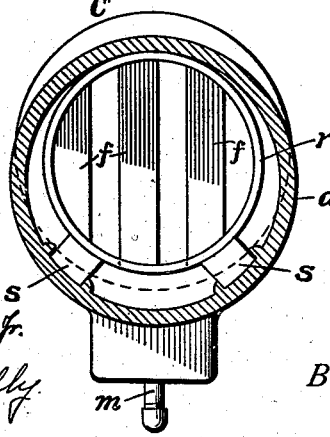

JOHN A. SERRELL, OF BAYONNE, NEW JERSEY, ASSIGNOR TO WARREN WEBSTER AND COMPANY, A CORPORATION OF NEW JERSEY.

APPARATUS FOR PURIFYING VAPORS AND GASES.

No. 885,185.

Specification of Letters Patent.

Patented April 21, 1908.

Application filed June 22, 1906. Serial No. 322,808.

*To all whom it may concern:*

Be it known that I, JOHN A. SERRELL, of Bayonne, Hudson county, State of New Jersey, have invented an Improvement in Apparatus for Purifying Vapors and Gases, of which the following is a specification.

In air washers or other apparatus for purifying vapors and gases by the removal of foreign matter or heavy particles by the use of water or other liquid, the air or gas is first passed through a spray or shower, by which the heavy particles are precipitated, and then through an eliminating chamber over baffles or plates, by which the moisture and lighter unprecipitated matter is eliminated. The efficiency of such apparatus depends upon the thoroughness of the precipitation of the matter by the liquid spray or shower in the purifying chamber, and also upon the complete removal of the moisture in the eliminating chamber. The more effective the spray or shower in mingling intimately with the air or gas, the more moisture will there be carried by the air or gas into the eliminator to be removed by the baffles.

It is one of the objects of my invention to obtain a most thorough action of the cleansing liquid in the purifying chamber and a most efficient elimination of the moisture and unprecipitated matter in the eliminating chamber.

The efficiency of the moisture eliminating baffles or plates depends in a great measure upon the rapidity with which the deposited moisture is discharged from them, and a part of my improvements relate to the construction and arrangement of the baffle plates whereby the discharge of the moisture is facilitated and the currents of air or gas act in aid of gravity in discharging the moisture and keeping the plates clean.

My invention also relates to improvements whereby the passage of the air or gas over the body of discharged water in eliminator and the consequent tendency to reabsorb moisture from it is prevented.

My invention further relates to means for collecting and discharging the liquid from the eliminator and enabling it to be used again in the spray or shower and for automatically replenishing the supply with fresh liquid to compensate for losses due to evaporation or leakage.

The invention also relates to various features of construction and combinations of parts by which these results are attained.

In the drawings: Figure 1 is a plan view of one form of my apparatus with the casing in longitudinal section to expose the interior; Fig. 2 is a longitudinal vertical section on the line A—A of Fig. 1; Fig. 3 is a longitudinal vertical section of a different form of the apparatus; Fig. 4 is a horizontal section on the line B—B of Fig. 3; Fig. 5 is a transverse vertical section on the line C—C of Fig. 4, and Fig. 6 is a plan view illustrating another form of the baffles or eliminator-plates.

$a$ is the outer shell or casing through which passes the air or gas to be purified. The passage of the air or gas through the apparatus may be produced or aided by suitable means such as a fan $b$. The air or gas enters the purifying chamber through the open or inlet end of the casing and passes through a shower or spray of water or cleansing liquid. This spray or shower may be produced by any suitable means. I prefer, however, to employ spring spray-nozzles $c$ as shown.

The water or liquid is supplied through a series of nozzles having their outlets controlled by conical spring spray heads $d$, which act to throw out the water in finely divided condition in conical showers. The character of the spray produced may be regulated by adjusting the tension of the springs $d'$ of the spray heads by means of valve stems $e$. The spray heads may be arranged at the top or bottom or at the sides of the purifying chamber or both at the top and bottom as shown in Fig. 2. In the latter case a very effective and thorough diffusion of the water or cleansing liquid is obtained.

The air inlet of the purifying chamber may be provided with transverse louvers $a^2$ for the purpose of preventing the spray from passing out through the air opening in case the fan stops. They also assist in distributing the water through the chamber and enable a shorter chamber to be employed.

Back of the purifying chamber is the eliminating chamber containing the baffles or eliminator plates $f$, which are preferably upwardly and forwardly inclined toward the inlet, and are arranged in staggered relation so that the air or gas must circulate around them in passing to the outlet. As shown these baffles or plates are arranged in staggered rows, the plates of one row spanning the space between adjacent plates in the next row. In Figs. 1 and 2 the plates or baffles are of channel shape in cross section, but I do not mean to confine myself to any particular section. In Figs. 3, 4 and 5 they are flat and in Fig. 6 they are formed with longitudinal strengthening ribs $g$.

$h$ is a false bottom or base support for the lower ends of the baffles $f$. It extends above the bottom of the casing and forms therewith a space or liquid chamber $i$ terminating at the end in a well $j$. The false bottom $h$ is provided with slots or openings $k$ adjacent to and in front of the lower ends of the baffles $f$ through which the liquid and extracted matter deposited on the baffles by the air or gas flows into the chamber $i$. The bottom of the casing is preferably inclined to drain into the well $j$. The front end of the false bottom $h$ is provided with a down-turned rib $h'$ and adjacent to this is a transverse rib $a'$ on the bottom of the casing. These ribs form a water seal between the spray chamber and the space $i$ which prevents any air passing directly into the space $i$ without entering the eliminating chamber.

$m$ is a valved drain pipe from the well $j$ by which the contents of the well with deposited matter may be discharged. I prefer to use the water supplied to the well as the spray water, and for this purpose I have shown a discharge pipe $n$ provided with a strainer head $o$ by which the water may be drawn from the well and supplied to the spraying heads.

$p$ is a supply pipe having a float controlled valve $p'$ by which liquid may be supplied to the well $j$ to make up for losses and maintain a sufficient quantity of liquid to supply the spray head.

The apparatus shown in Figs. 3, 4 and 5 is generally similar to that shown in Figs. 1 and 2 except that the outer casing $a$ is cylindrical and the elimination plates are formed in cylindrical ring sections $r$ $r'$ &c. which are supported eccentrically in the casing and form a tubular eliminating chamber with the liquid chamber or dead space $i$ between the casing and the outside of the cylindrical sections. Each section consists of an outer ring having the baffles extending from the lower rear edge to the upper front edge and the opening $k$ in the lower portion of the ring in front of the lower ends of the baffles. The rings are of smaller diameter than the casing $a$, and are supported eccentrically by means of supporting lugs $s$, so that the space $i$ is formed between the casing and the ring sections. The position of the baffles in successive sections are reversed as shown so as to produce the staggered effect. This may be accomplished by arranging the baffles out of center and reversing successive rings.

The air or gas to be purified enters the inlet of the apparatus and passes through the shower or spray in the spray chamber, and the dust and heavier particles of matter are removed by the spray and precipitated. The air then passes through the eliminator chamber and as it moves over the baffles or eliminator plates it deposits the moisture, with such lighter particles of matter as it still contains, upon the front surfaces of the plates, and finally passes out purified and dried.

The effectiveness of the eliminator in removing the moisture depends, to a large extent, upon the dryness of the contact surfaces of the plates and consequently upon the quickness and ease with which the deposited moisture is discharged. The inclination of the plates or baffles downwardly and backwardly with reference to the direction of movement of the air or gas aids materially in discharging the moisture, since the air currents impinging on these inclined surfaces are more or less deflected and this deflection tends to produce a downward pressure on the moisture, acting in aid of gravity to drive it to the outlets.

By discharging the moisture into a dead space or chamber $i$ sealed to the entrance of air from the spraying chamber I avoid any tendency of air currents passing over the body of discharged water to take up moisture from it and again deposit such moisture on the eliminator plates without any useful result. There is also a tendency to the production of a lower pressure in the chamber $i$ and the creation of draft downward through the opening $k$ which facilitates the discharge of the moisture from the plates. The effective removal of the moisture from the plates also removes such particles of matter as have been deposited and tends to keep the plates more clean and efficient.

While I have shown my improvements in a form particularly adapted for air washing or purifying by means of water, I do not mean to limit myself to this use, as the apparatus may be applied to other uses, such, for example, as a smoke condenser for removing the unconsumed carbon particles of smoke, and particularly of smoke produced by the combustion of soft coal. The apparatus may also be used with cleaning fluids other than water.

I claim as new and desire to secure by Letters Patent:

1. In apparatus of the character described, the combination of a purifying chamber having a liquid shower or spray, and a moisture eliminating chamber provided with a series of baffles arranged in an upright position and inclining forwardly from the bottom toward the air inlet.

2. In apparatus of the character described, the combination of a purifying chamber having a liquid shower or spray, and a moisture eliminating chamber provided with a series of baffles arranged in an upright position and inclining downwardly and backwardly from the top with reference to the direction of movement of the air or gas to be cleansed, the adjacent baffles being separated from one another by vertical spaces.

3. In an apparatus of the character described, the combination of a purifying chamber having a liquid shower or spray, an eliminating chamber having a base provided with openings for the discharge of the liquid, and a series of baffles in said eliminating chamber arranged in an upright position and inclining forwardly from said base toward the purifying chamber.

4. In apparatus of the character described, the combination of a purifying chamber having a liquid shower or spray, an eliminating chamber having a perforated base, a chamber for the collection of liquid below said base, and a series of baffles in said eliminating chamber extending from said base and arranged in an upright position inclining forwardly toward the purifying chamber.

5. In apparatus of the character described, the combination of a purifying chamber having a liquid shower or spray, an eliminating chamber communicating with said purifying chamber and having a base, a chamber for the collection of liquid below said base, a well communicating with said chamber and a series of baffles extending upwardly from said base, said base being provided with discharge openings into said liquid chamber in front of the lower ends of said baffles.

6. In apparatus of the character described, the combination of a purifying chamber having a liquid shower or spray, an eliminating chamber communicating with said purifying chamber and having a base, a chamber for the collection of liquid below said base, a well communicating with said chamber, a pipe for discharging the contents of said well, and a series of baffles extending upwardly from said base, said base being provided with discharge openings into said liquid chamber in front of the lower ends of said baffles.

7. In apparatus of the character described, the combination of a purifying chamber having a liquid shower or spray, an eliminating chamber communicating with said purifying chamber and having a base, a chamber for the collection of liquid below said base, a well communicating with said chamber, a pipe for discharging the contents of said well, a strainer head for said pipe and a series of baffles extending upwardly from said base, said base being provided with discharge openings into said liquid chamber in front of the lower ends of said baffles.

8. In apparatus of the character described, the combination of a purifying chamber having a liquid shower or spray, an eliminating chamber communicating with said purifying chamber, a base for said eliminating chamber provided with openings for the discharge of liquid, moisture eliminating baffles in said eliminating chamber, and a liquid chamber below said base.

9. In apparatus of the character described, the combination of a purifying chamber having a liquid shower or spray, an eliminating chamber communicating with said purifying chamber, a base for said eliminating chamber provided with openings for the discharge of liquid, moisture eliminating baffles in said eliminating chamber, and a liquid chamber below said base, said liquid chamber communicating through a water sealed inlet with the purifying chamber.

10. In apparatus of the character described, the combination of a purifying chamber having a liquid shower or spray, an eliminating chamber having a perforated base, a chamber for the collection of liquid below said base, a series of baffles in said eliminating chamber extending from said base and arranged in an upright position inclining forwardly toward the purifying chamber, a discharge pipe for discharging the liquid from said chamber, and a supply pipe for supplying liquid to said chamber to compensate for losses.

11. In apparatus of the character described, the combination of a purifying chamber having a liquid shower or spray, an eliminating chamber communicating with said purifying chamber, a base for said eliminating chamber provided with openings for the discharge of liquid, moisture eliminating baffles in said eliminating chamber, and a liquid chamber below said base, a discharge pipe for discharging the liquid from said chamber, and a supply pipe for supplying liquid to said chamber to compensate for losses and an automatic valve for controlling said supply pipe.

12. In apparatus of the character described, the combination of a purifying chamber having a liquid shower or spray, and an eliminating chamber formed of sections arranged face to face each section carrying upright baffle plates.

13. In apparatus of the character described, the combination of a purifying chamber having a liquid shower or spray, and an eliminating chamber formed of sections arranged face to face each section carrying upright baffle plates and provided with a discharge outlet adjacent to the front lower end of the baffles.

14. In apparatus of the character described, the combination of a purifying chamber having a liquid shower or spray, and an eliminating chamber formed of sections arranged face to face each section carrying upright baffle plates inclining upwardly and forwardly.

15. In apparatus of the character described, the combination of an outer casing, a purifying chamber having a liquid shower or spray in the front end of said casing, an eliminating chamber within said casing composed of a series of sections arranged face to face and each provided with baffles, said sections being of smaller sectional area than the inclosing casing and forming a liquid chamber at the bottom between their outer surface and the inclosing casing and having openings for the discharge of liquid adjacent to the front lower ends of the baffles.

16. In apparatus of the character described, the combination of a purifying chamber having a liquid shower or spray, and an eliminating chamber formed of sections arranged face to face and each provided with baffles extending from the lower back edge to the upper front edge.

17. In apparatus of the character described, the combination of a purifying chamber having a liquid shower or spray, and an eliminating chamber formed of sections arranged face to face and each provided with baffles extending from the lower back edge to the upper front edge and having an opening for the discharge of liquid adjacent to the lower front end of the baffles.

18. In apparatus of the character described, the combination of a purifying chamber having a liquid shower or spray and having its inlet provided with transverse horizontal louvers, an eliminating chamber communicating with the purifying chamber, and moisture eliminating baffles in said eliminating chamber.

In testimony of which invention, I hereunto set my hand.

JOHN A. SERRELL.

Witnesses:
WM. M. TREADWELL,
NETTIE CAMPBELL.